United States Patent [19]
Constantine

[11] Patent Number: 5,279,712
[45] Date of Patent: Jan. 18, 1994

[54] PROCESS AND APPARATUS FOR THE PYROLYSIS OF CARBONACEOUS MATERIAL

[75] Inventor: Anthony Constantine, Crawley, Australia

[73] Assignee: Pasco Nominees Pty Limited, Crawley, Australia

[21] Appl. No.: 861,918

[22] Filed: Apr. 1, 1992

[30] Foreign Application Priority Data

Apr. 5, 1991 [AU] Australia ............................. PK5442

[51] Int. Cl.$^5$ ............................................. C10B 51/00
[52] U.S. Cl. ........................................ 201/37; 201/15;
201/27; 201/43; 202/90; 202/108; 202/113
[58] Field of Search ...................... 201/10, 15, 27, 37,
201/43, 44; 202/90, 108, 113, 121, 129, 134, 150

[56] References Cited
U.S. PATENT DOCUMENTS

| | | | |
|---|---|---|---|
| 3,177,128 | 4/1965 | Vartanian | 202/108 |
| 3,971,704 | 7/1976 | von Klenck et al. | 202/108 |
| 3,988,210 | 10/1976 | Pikón et al. | 202/108 |
| 4,424,021 | 1/1984 | Merrill, Jr. | 432/14 |
| 4,476,789 | 10/1984 | Constantine | 110/229 |
| 4,734,165 | 3/1988 | Bauer et al. | 202/108 |
| 4,935,099 | 6/1990 | Weiss et al. | 201/27 |

FOREIGN PATENT DOCUMENTS

| | | | |
|---|---|---|---|
| 2528062 | 12/1983 | France | C10B 53/02 |
| 2583427 | 12/1986 | France | C10B 53/02 |
| 2621032 | 3/1989 | France | C10B 53/02 |

*Primary Examiner*—Joye L. Woodard
*Attorney, Agent, or Firm*—Gipple & Hale

[57] ABSTRACT

A process for the pyrolysis of carbonation materials such as wood which comprises directly or indirectly heating the carbonaceous material with flue gases. When carbonization commences the direct heating is stopped while indirect heating continues until carbonization is complete. There is also described an application for effecting the process.

8 Claims, 1 Drawing Sheet

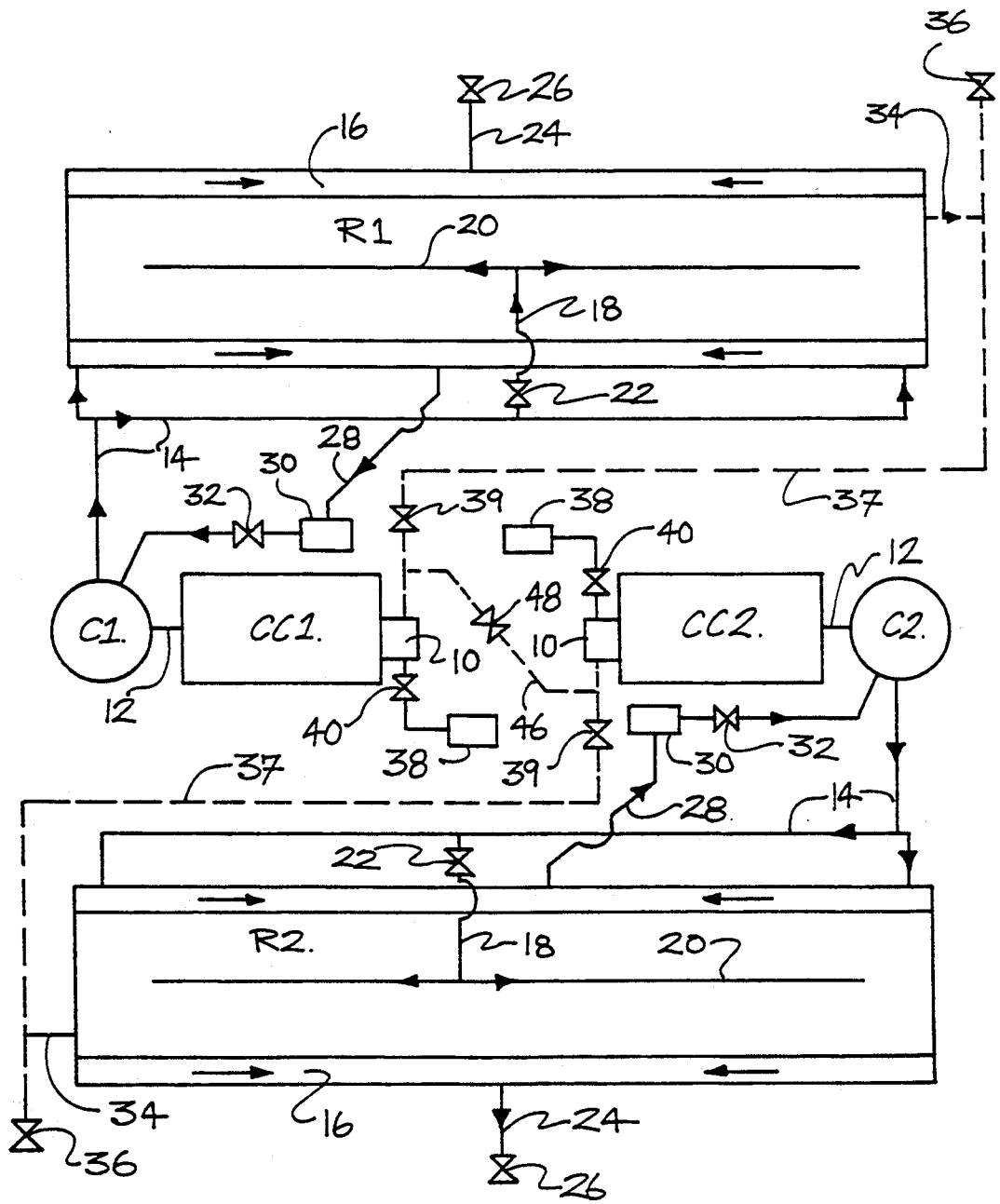

PROCESS AND APPARATUS FOR THE PYROLYSIS OF CARBONACEOUS MATERIAL

BACKGROUND OF THE INVENTION

This invention relates to the pyrolysis of carbonaceous materials and, in particular, to a method for improving the energy efficiency of such processes.

Pyrolysis processes are common in industry and a typical example is charcoal production from wood. Because of the widespread location of most wood resources it is uneconomic to operate large continuous retorts for charcoal production due to high wood transport and capital costs. Kilns, which burn part of the charge to provide heat for the process are commonly used but the yield is low as wood is wasted and cycle times extend to some weeks.

Batch retorts are sometimes employed and obviously such retorts must be operated as efficiently as possible as the capital cost is higher than kilns of equal capacity. This requires efficiency in fuel usage as the costs of fuels sourced externally to the wood resource are a major factor in plant economics.

Another serious problem that arises with conventional kilns and retorts is that volatile components evolved in the flue gases from the carbonaceous feedstock contain a wide range of chemical compounds. Such evolution is environmentally undesirable when released to the atmosphere and may be detrimental to health as some volatile components have been identified as carcinogens. Moreover, the unregulated emission of such volatile components represents a waste of a potential fuel because the components if combusted can readily be employed as a fuel resource thus enhancing the economics of the pyrolysis process. Emissions from all kilns and retorts are so heavily laden with moisture that they will not burn without assistance from external fuel.

SUMMARY OF THE INVENTION

The present invention provides a process for pyrolysing carbonaceous feedstocks that is both energy efficient and environmentally clean, and the emissions will burn without assistance from external fuels.

In accordance with one aspect of the present invention there is provided a process for the pyrolysis of carbonaceous materials which comprises placing a charge of carbonaceous material into a retort having an annular jacket, generating flue gases in a combustion chamber, passing the flue gases to the annular jacket so as to cause indirect heating of the charge in the retort, simultaneously passing a proportion of the flue gases directly into the retort to cause direct heating of the charge, continuing the direct and indirect heating by the flue gases until such time as carbonization of the charge commences and then ceasing direct heating, continuing with indirect heating by the flue gases until the carbonization is complete, and then removing the carbonized charge from the retort.

The present invention will now be described, by way of example, with reference to the accompanying drawing, which is a plan view of an apparatus for pyrolysing carbonaceous materials particularly wood.

BRIEF DESCRIPTION OF THE DRAWINGS

FIG. 1 is a plan view of a schematic of the invention showing an apparatus for pyrolysing carbonaceous materials.

DESCRIPTION OF THE PREFERRED EMBODIMENT

In the drawing there is shown an apparatus for pyrolysing carbonaceous materials comprising first and second retorts R1 and R2. The retorts R1 and R2 are arranged to operate in pairs.

The charge to the retorts R1 and R2 is in the form of stacked wood which may be placed in buggies which are driven into the retorts on rails.

Each retort R1 and R2 has a corresponding combustion chamber CC1 and CC2 respectively. Each combustion chamber CC1 and CC2 has a fuel-inlet 10 and an outlet 12. A respective cooler C1 and C2 is connected to each outlet 12. A respective line 14 extends from each cooler C1 and C2 to each retort R1 and R2.

There is an annular jacket 16 around each retort R1 and R2 and each line 14 extends into a respective jacket 16 at two points as shown in the drawing. Each annular jacket 16 contains a helical baffle to provide a path for gases therein and to increase velocity and residence time and thereby assist heat transfer. In addition there is a respective inlet line 18 which extends from each line 14 and passes into the interior of each retort R1 and R2. Each line 18 is connected to a distribution line 20 which extends longitudinally along each retort R1 and R2. Each line 18 is provided with a valve 22.

Further, each jacket 16 is provided with a respective outlet line 24. Each line 24 is provided with a valve 26. Further, there is a respective line 28 extending from each jacket 16 through a fan 30 back to the respective cooler C1 and C2. Each line 28 is provided with a valve 32. Still further, there is a respective line 34 from each retort R1 and R2 which extends to atmosphere through a respective valve 36 or back to the fuel inlet 10 of the respective combustion chamber CC1 or CC2 through a return line 37. Each line 37 Thus, it can be seen that there is no interconnection between the retort and jacket whereby flue gases in the jacket are precluded from admixing with pyro gases in the retort. is provided with a respective valve 39.

Yet further, there is provided a respective air supply fan 38 for each combustion chamber CC1 and CC2 which supplies air to the combustion chamber through a respective valve 40.

Furthermore, there is a cross-connection line 46 between the lines 37. The cross-connection line 46 is provided with a valve 48.

In use, to commence operation of the apparatus, wood is placed in buggies and driven into the retort R1 which is initially at ambient temperature. The retort R1 is then sealed off.

A suitable fuel such as a liquid, gaseous or solid fuel, for example, kerosene or natural gas or, in some instances, wood, is supplied to the inlet 10 of the combustion chamber CC1. The fan 38 and 30 are put into operation and the valves 40 and 32 are opened. An acetylene starting torch is then inserted into the combustion chamber CC1. The fuel is thus ignited and the combustion chamber CC1 is heated gradually over a period of say 4 or 5 hours to a temperature of about 1000° C. The acetylene torch is then removed. By this stage the temperature of the flue gases at the outlet 12 is of the order of 1000° C. This process is also used to start up the combustion chamber CC2 from cold but as described below, once the process is operating the need for external fuel is minimized by the use of pyro gases given off in the retorts R1 and R2 and by the cross-connection of the retorts R1 and R2.

The flue gases pass to the cooler C1. As the components of the retort R1 may be made of mild steel and may not be able to withstand an operating temperature of 1000° C., the flue gases are preferably cooled in the cooler C1 by the recycled gases from the fan 30 passed along the line 28 through the valve 32 as will be described. In this way, the flue gases from the combustion chamber CC1 are typically cooled down to a temperature of the order of 600° C. and the recycled flue gas is continuously re-heated. The flue gases then pass through the line 14 to the annular jacket 16 of the retort R1. The flue gases circulate around the annular jacket 16 and cause the charge in the retort R1 to be indirectly heated.

In addition, the valve 36 is maintained in open condition at this stage of the operation and the valve 22 is opened to allow flue gases surplus to those recycled and equivalent to the fuel combusted to pass from the line 14 through the line 18 and then into the distribution line 20. The surplus flue gases are thus passed directly into the retort R1 and cause direct heating of the charge therein. This has the advantage that the charge is heated more quickly than is the case when indirect heating is applied alone. The surplus flue gases which have been used for direct heating of the charge are vented to atmosphere through the line 34 and the valve 36. The indirect heating by means of the jacket 16 proceeds on a continuous basis whilst the direct heating is being carried out and after it has ceased as will be described.

Surprisingly, it has been found that the application of flue gases directly to the charge does not cause the charge to be ignited by the oxygen in the flue gases. This failure of the charge to ignite is because steam driven off from the charge in the initial heat up phase prevents ignition as it slightly pressurises the interior of the retort. Thus, direct heating is preferably continued up to the point where carbonization of the charge commences which is generally when the charge has a temperature in the order of 230° C. Commencement of carbonization can be detected by the presence of smoke at the exhaust from the valve 36 or by testing the exhaust gases for combustibility. Then the valve 22 is closed and the valve 26 is opened and direct heating ceases. The action of direct heating at a relatively high temperature substantially reduces the amount of free moisture in the charge prior to commencement of carbonization.

At this stage the charge is evolving pyro gases. These pyro gases are combustible without assistance from external fuel because of the amount of free moisture which has already been driven off during the direct heat up phase. The valve 36 is then closed and the pyro gases are therefore taken along the line 37 through the valve 39 to the fuel inlet 10 of the combustion chamber CC1. The pyro gases thus become the fuel for the combustion chamber CC1 and there is a reduced need for external fuel.

The valve 26 in the line 24 from the jacket 16 is usually closed while flue gas is being directly injected into the retort R1. However, when direct injection is stopped the valve 26 is opened so that surplus, spent flue gases can be vented to atmosphere from the jacket 16.

However, a proportion of the flue gases which have been cooled to about 350° C. by being circulated through the annular jacket 16 are also recycled continuously by the recycling fan 30 via the valve 32 back to the cooler C1. In the cooler C1 the recycled gases are heated back up to 575° C. and are then returned back to the line 14 for further indirect heating of the charge. The proportion of the flue gas which is recycled is regulated by the valve 32 and is typically such that the temperatures at the inlet and the outlet to the jacket 16 are 450° and 360° respectively during the direct injection stage. During carbonization the outlet temperature from the jacket 16 tends to rise to 400° C. or more. However, the heat input required is reduced because the process is now exothermic and therefor the volume of recycled gas is also reduced. The amount of fuel burned in the combustion chamber is that required to bring the temperature of the recycled gas back up to 575° C. The amount of recycled gas is constant with any given setting of the valve 32 and surplus flue gas is released to atmosphere through the valve 26 in a self regulating manner.

The indirect heating of the charge in the retort R1 continues until the amount of condensable volatiles being given off diminishes to a low level. The remaining volatiles up to 20% are mainly dry gases.

Then hot charcoal is withdrawn from the retort by pulling the buggies from the retort. The charcoal is then allowed to cool. The indirect heating by flue gas is maintained continuously during unloading and reloading of the retort R1 so as to maintain the components of the retort at elevated temperature and reduce the heat input required when the process is recommenced.

At a suitable stage in the operation of the retort R1 the retort R2 is put into operation.

It has been found that by the use of a combination of direct and indirect heating the cycle time for each retort can be reduced to about 20 hours from a nominal cycle time of 24 hours. Further, the retorts R1 and R2 are conveniently operated at a cycle spacing of about 10 hours. Thus, at the 10 hour stage of operation of the retort R1 the retort R2 can be put into operation by diverting a portion of the pyro gases from the line 37 along the interconnecting line 46 by opening of the valve 48. This pyro gas acts as a fuel for the combustion chamber CC2 during the start up phase of the apparatus. The inter connecting line 46 has to be short and heavily insulated otherwise it becomes readily blocked with tars. The use of the line 46 reduces the requirement for external start up fuel and the entire process is substantially self sufficient in fuel.

When the retort R1 is reloaded with a fresh charge and the retort R2 has reached a suitable stage in its cycle, the retort R1 can be started up again by use of pyro gases from the retort R2.

The burning of the pyroligneous products reduces emission of dangerous and undesirable chemicals considerably. The apparatus and process of the present invention has been found to be suitable for use with green wood having a high proportion of moisture such as about 55% by weight. This is because a large amount of free moisture is given off during the heat up phase when direct heating is employed. The high level of moisture may prolong the initial direct heating phase but eventually carbonization commences and proceeds in the manner described above.

The flue gases used to heat the charge could be operated at higher temperatures providing the retorts were constructed of a suitable high temperature resistant material. Modifications and variations such as would be apparent to a skilled addressee are deemed within the scope of the present invention.

I claim:

1. A process for the pyrolysis of carbonaceous materials which comprises placing a charge of carbonaceous material into a retort having an annular jacket, generating flue gases in a combustion chamber, passing the flue gases to the annular jacket so as to cause indirect heating of the charge in the retort, simultaneously passing a proportion of the flue gases directly into the retort to cause direct heating of the charge, continuing the direct and indirect heating by the flue gases until such time as carbonization of the charge commences and then ceasing direct heating, continuing with indirect heating by the flue gases until the carbonization is complete, and then removing the carbonised charge from the retort.

2. A process according to claim 1, in which the combustion chamber is followed by a cooler to reduce the temperature of the flue gases before they are passed to the jacket.

3. A process according to claim 1, in which a proportion of the flue gases from the jacket are removed, reheated and returned to the jacket.

4. A process according to claim 1, in which pyro gases evolved by the charge during carbonization are fed to the combustion chamber to provide fuel therefor.

5. A process according to claim 1, in which a pair of retorts are operated in tandem at spaced cycle times so that once the process is operating pyro gases from one retort can be fed to the combustion chamber of the other retort to provide fuel therefor during start up.

6. A process according to claim 1, in which direct heating ceases when the temperature of the charge reaches from 170° to 200° C.

7. An apparatus for the pyrolysis of carbonaceous material which comprises a pair of retorts provided with jackets, a respective combustion chamber for each retort, a respective line from each combustion chamber to the respective jacket for feeding flue gases to the jacket, conduit means for feeding flue gases originating from each combustion chamber directly into the respective retort for direct heating of a charge of carbonaceous material, and a second respective line for feeding pyro gases resulting from pyrolysis of the carbonaceous material from each retort to the respective combustion chamber, wherein the pair of retorts is arranged to operate in tandem and has an interconnecting line between the second respective lines for feeding pyro gases to the combustion chambers, so that pyro gas from one retort can be fed to the combustion chamber of the other retort.

8. An apparatus for the pyrolysis of carbonaceous material which comprises a retort provided with a jacket, a combustion chamber, a first line from the combustion chamber to the jacket for feeding flue gases from the combustion chamber to the jacket, conduit means for feeding flue gases originating from the combustion chamber directly into the retort for direct heating of a charge of carbonaceous material, a valve means mounted in the conduit means which is arranged to be opened so that flue gases can be fed directly into the retort and closed so that flue gases are prevented from being directly fed into the retort, a third line from the retort connected to the combustion chamber, a valve means mounted in said third line for venting gases evolved from the retort directly to atmosphere when the valve means is open or for directing gases evolved from the retort to the combustion chamber when the valve means is closed, a fourth line from the jacket extending to atmosphere, a valve means mounted in the fourth line for enabling gases to be vented directly to atmosphere from the jacket, the apparatus being devoid of any interconnection between the retort and the jacket whereby flue gases in the jacket are precluded from admixing with pyro gases in the retort.

* * * * *